Oct. 6, 1959    H. P. SHERMAN    2,907,272
MACHINE FOR SPIRIT DUPLICATING
Filed Aug. 18, 1955    6 Sheets-Sheet 1
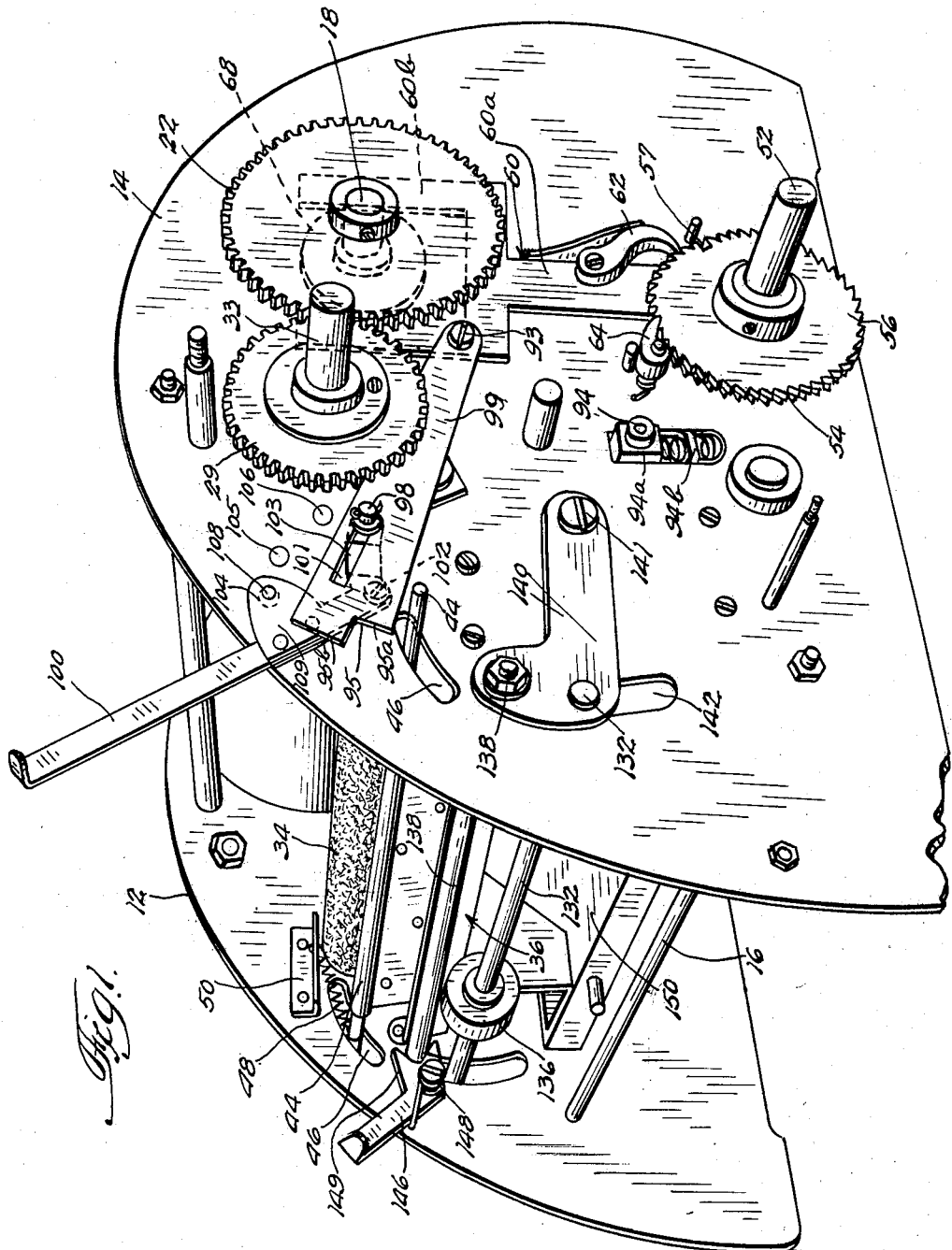
INVENTOR.
Herbert P. Sherman
BY
ATTY.

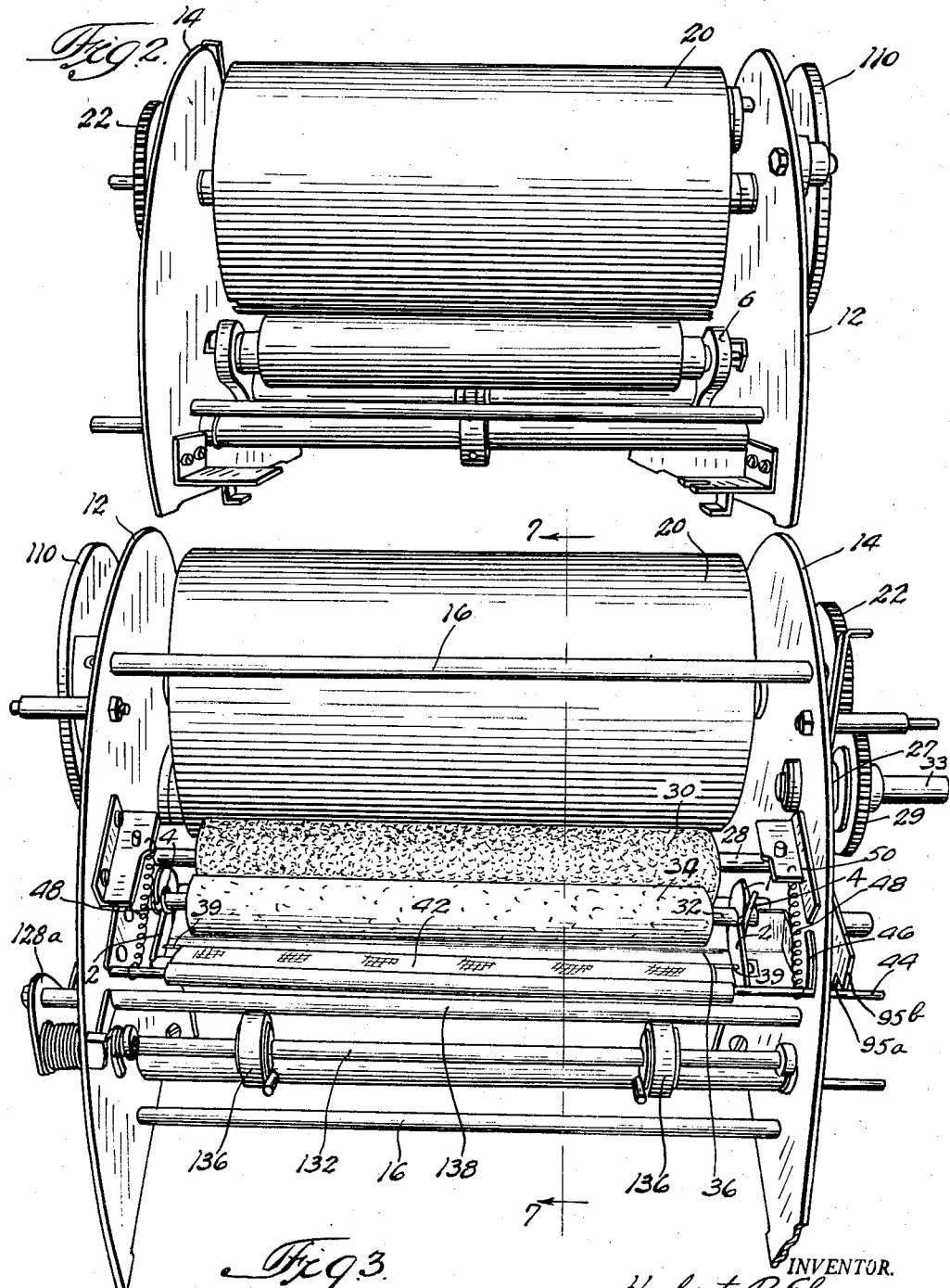

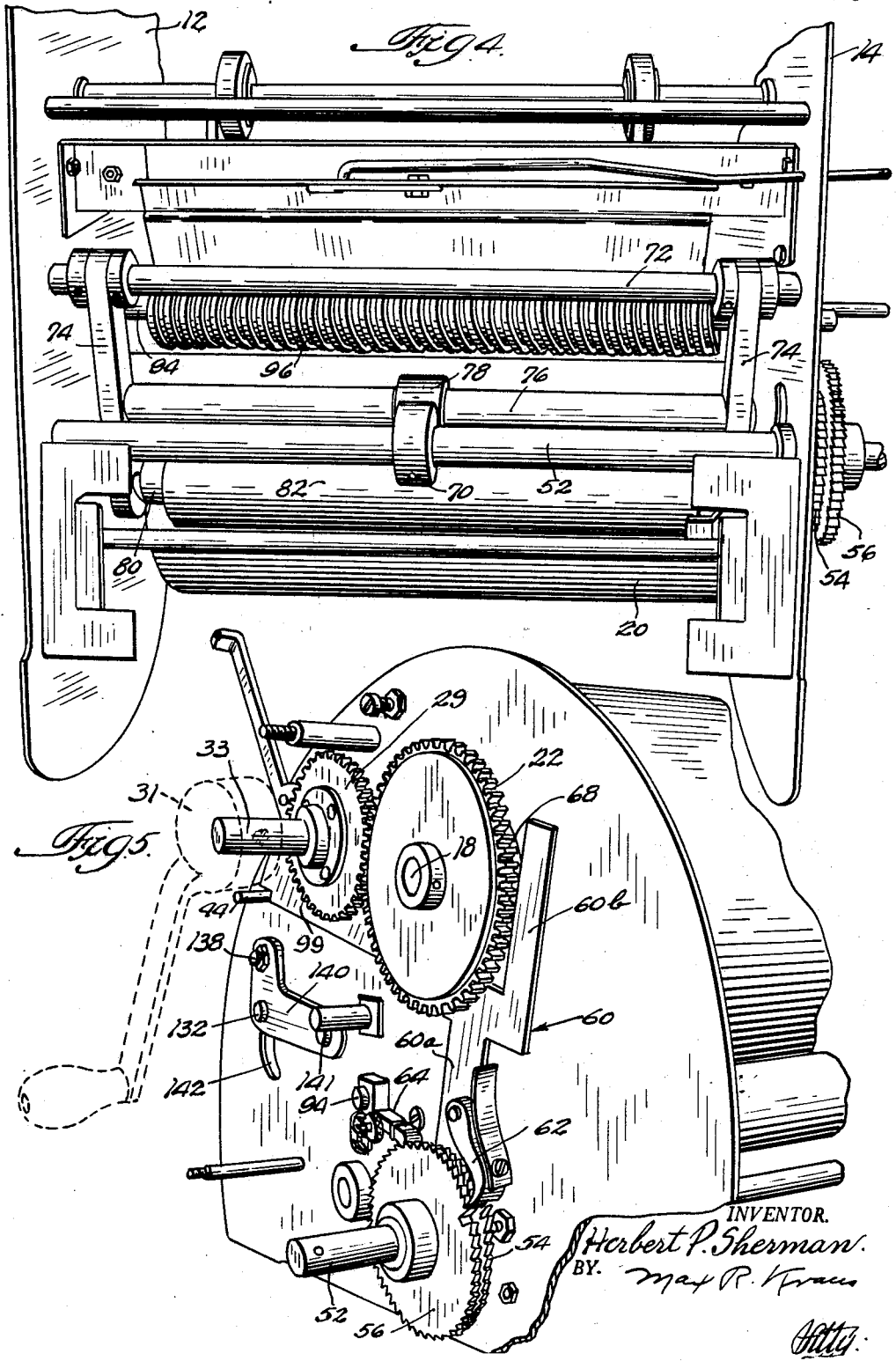

Oct. 6, 1959  H. P. SHERMAN  2,907,272
MACHINE FOR SPIRIT DUPLICATING
Filed Aug. 18, 1955  6 Sheets-Sheet 4
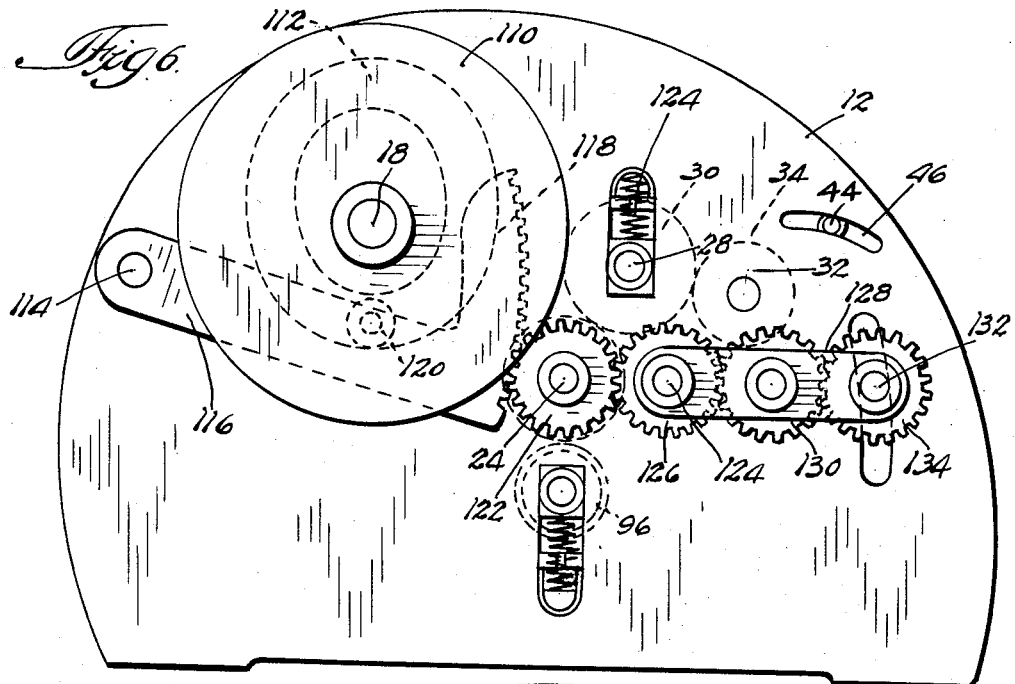
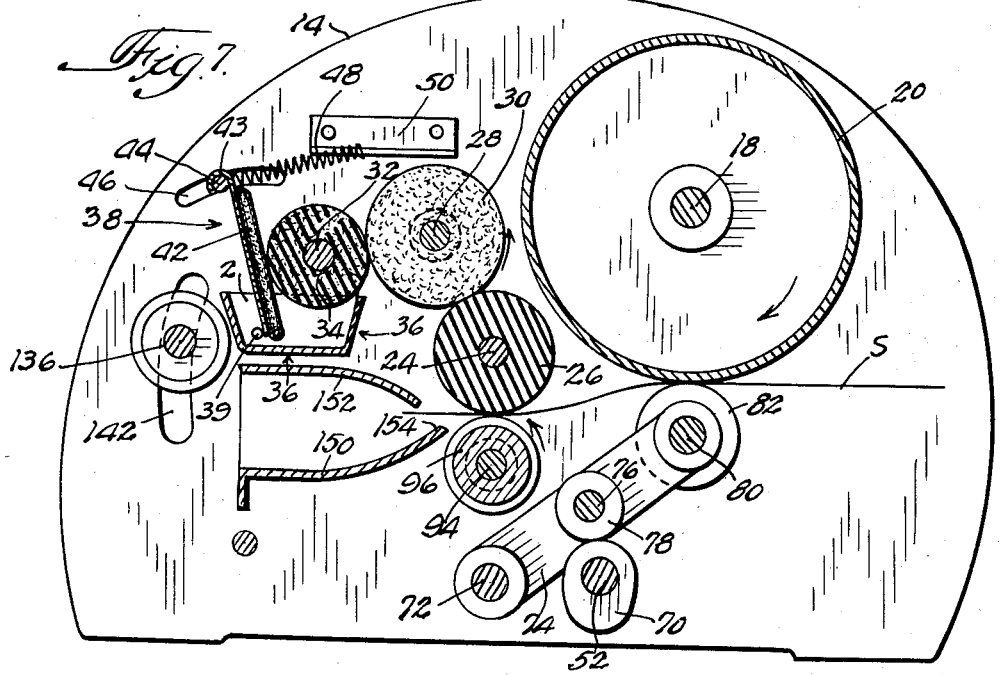
INVENTOR.
Herbert P. Sherman.

Oct. 6, 1959     H. P. SHERMAN     2,907,272
MACHINE FOR SPIRIT DUPLICATING
Filed Aug. 18, 1955                                      6 Sheets-Sheet 5
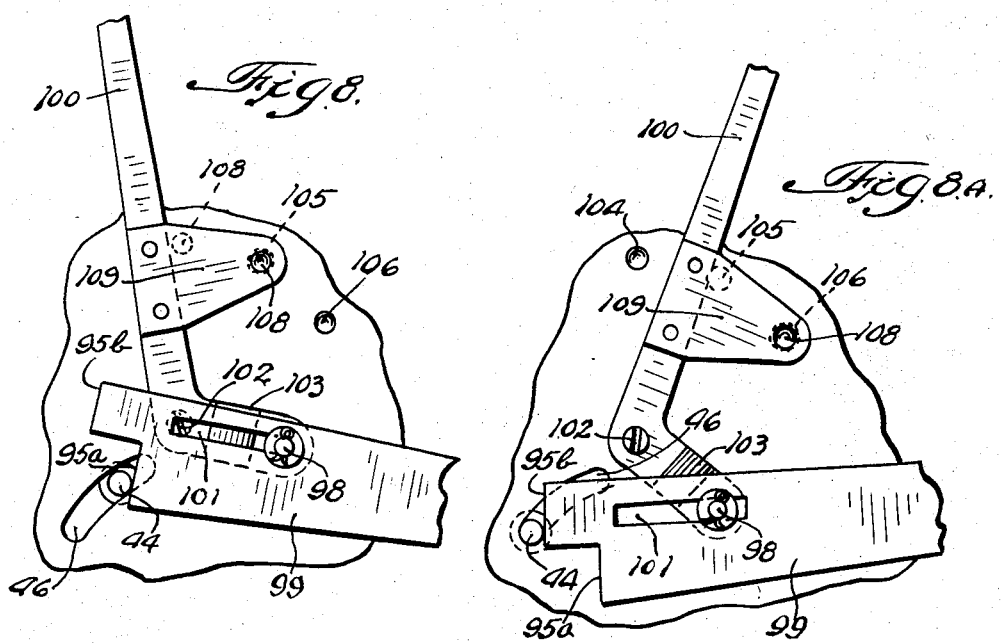
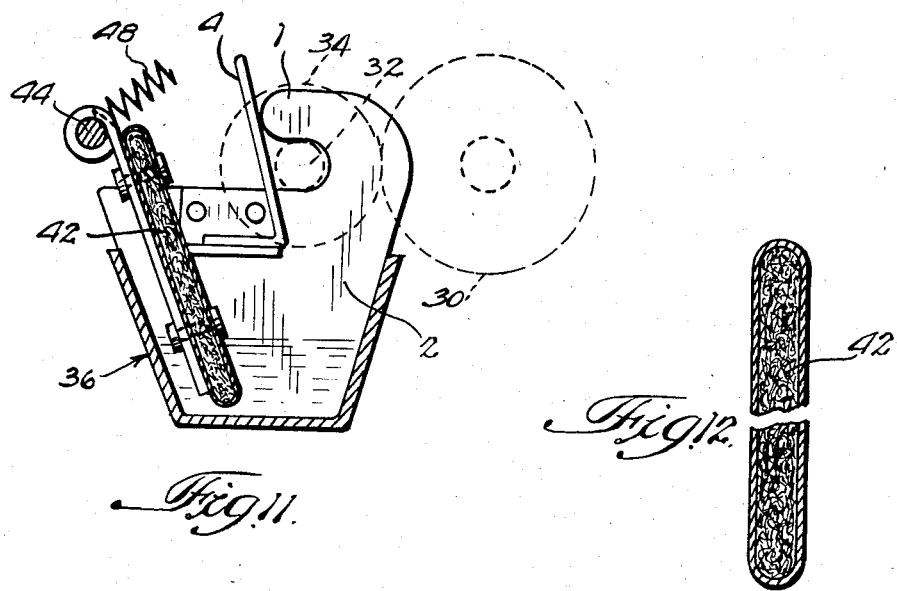
INVENTOR.
Herbert P. Sherman
BY Oct. 6, 1959 H. P. SHERMAN 2,907,272
MACHINE FOR SPIRIT DUPLICATING
Filed Aug. 18, 1955 6 Sheets-Sheet 6

INVENTOR.
Herbert P. Sherman
BY Max R. Kraus
ATTY.

United States Patent Office 2,907,272
Patented Oct. 6, 1959

2,907,272

MACHINE FOR SPIRIT DUPLICATING

Herbert P. Sherman, Chicago, Ill.

Application August 18, 1955, Serial No. 529,088

11 Claims. (Cl. 101—132.5)

This invention relates to the art of printing by means of duplicating and more particularly to a machine for spirit duplicating.

In the art of spirit duplicating a master sheet having a dye composed carbonized impression is mounted on a drum and sheets of paper are first coated with a film of alcohol and passed in contact with the master sheet. The alcohol on the paper being a solvent for the dye, removes a quantity of the dye composed carbon from the master sheet to reproduce and make copies. The prior art construction has many disadvantages which are obviated with the present invention and are more specifically pointed out in connection with the objects of this invention.

One of the objects of this invention is to provide a new and improved machine for use in spirit duplicating which may be selectively operated to control the amount of liquid spirit or alcohol applied to a sheet of paper or material prior to the printing thereon.

Another object of this invention is to provide a machine wherein the amount of the liquid spirit deposited on the wetting roller may be selectively controlled.

Another object of this invention is to provide a machine of the foregoing character which automatically adjusts the pressure of the impression roller against the drum between which the sheet of spirit dampened paper passes so that the pressure is progressively increased with each number of sheets passing through said machine thereby producing uniform good copies and reproductions through the printing run.

It is well known in the art that the printed impressions on the sheets of paper become fainter and fainter as the number of sheets are passed through the machine. In the prior art the number of clearly printed copies possible are few. With this invention this objectionable feature is greatly eliminated in that it is provided that the pressure of the impression roller against the drum is controlled by the number of revolutions of the drum itself to the extent that the pressure of the impression roller increases progressively with each series of revolutions. In this instance with every fifty drum revolutions, or sheets of paper passing through the machine the pressure of the impression roller is automatically and mechanically increased against the drum thereby producing uniform good reproductions and increasing the number of copies reproduced from a master sheet. With this invention it is possible to produce a great many more uniformly printed copies than is capable of being produced by any machine on the market.

Another object of this invention is to provide a new and different type of counting mechanism which counts the number of sheets passed through the machine.

Another object of this invention is to provide a machine which will print with the minutest deposit of spirit fluid on the surface of the sheet to be printed, where the printed sheet does not blot; where there is no penetration of the printing through the sheet so that the opposite side of the printed sheet is clean; where no streaks appear on the printed sheet and where the printed sheet is much dryer when it is discharged from the machine. The major result of all these provision is to provide a machine which will produce many more clearly printed copies from one master sheet for the reason that with less fluid deposited on the printed copy the life of the master sheet is considerably extended.

Another object is to provide a series of cylindrical rollers made of different materials by which the liquid spirit is transferred prior to its coating the sheet, thereby making it possible to control the degree of coating on the sheet to a heavy, medium or a very thin uniform coating.

The advantages of spirit duplicating over other types of duplicating is well understood in the art, however, there were certain inherent disadvantages in the present spirit duplicating machines. The principal disadvantage is that with the present spirit duplicating machines it is impossible to get more than a few hundred sharp, bright, clearly legible reproduced sheets from one master sheet. This is due to the fact that said machines do not have positive means for controlling the amount of spirit fluid deposited on the sheets of paper before they pass between the drum and impression roller. Furthermore said machines must resort to manual adjustment in order to increase the pressure of the impression roller on the drum for increasing the number of reproduced sheets. Manual adjustment reduces speed of operation and lacks uniformity of adjustment and requires more manual effort on the part of the female operator than she can provide. The above disadvantages are all eliminated by the present invention.

While this invention is directed particularly to a spirit duplicating machine it will be clear that the features inherent in said machine are equally applicable and may be used with equal facility in the coating of paper stock so that instead of coating the paper as herein with a liquid spirit alone the paper may be coated with any other liquid chemical merely by substituting the liquid chemical in the trough. If used in the coating of paper stock or like material then the drum would not carry a master copy as no reproduction is desired and the paper or other stock would pass between a drum or cylinder and the impression roller as will be understood.

Other objects will become apparent as this description progresses.

In the drawings:

Fig. 1 is a perspective view of the machine taken from the front with the front tray removed.

Fig. 2 is a rear perspective view.

Fig. 3 is a front perspective view.

Fig. 4 is a bottom view looking up.

Fig. 5 is a perspective view of the right side of the machine as viewed from the rear.

Fig. 6 is a side elevational view of the machine taken on the left side of the machine.

Fig. 7 is a cross sectional view taken on lines 7—7 of Fig. 3.

Figs. 8 and 8a are fragmentary views showing the "medium" and "low" positions respectively of the lever and arm in operating the wick member.

Fig. 11 is a cross sectional view taken on line 11—11 of Fig. 7, and

Fig. 12 is a cross sectional view of the wick.

Figure 9:
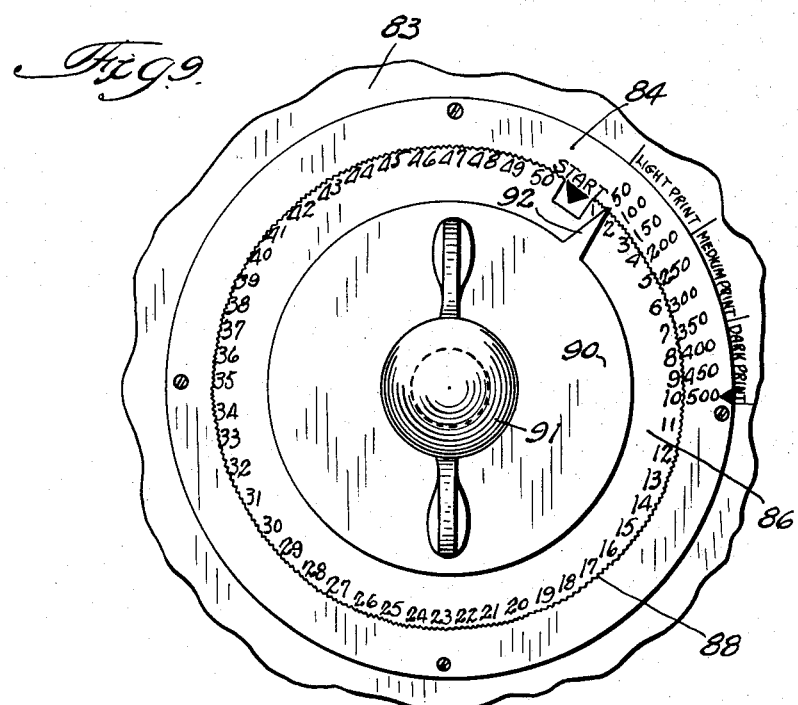
Fig. 9 is a front view of the dial and counting mechanism.

The frame of the machine is formed of a pair of side plates or walls 12 and 14 spacedly held together by a plurality of transverse fastening rods 16 suitably bolted or otherwise secured to the side plates 12 and 14.

Journalled on the side plates is a shaft 18 which supports a rotatable metal drum 20. Fixedly secured to shaft 18 exteriorly of the side plate 14 is a gear 22 which is driven to rotate the drum 20.

Positioned forwardly of the drum 20 is a rotatable shaft 24 which is suitably journalled in the side plates 12 and 14 and which carries a cylinder roller 26 in spaced relation to the drum 20. Cylinder roller 26 is the wetting roller and is made of neoprene or synthetic rubber. Journalled in the side plates is a shaft 28 which supports a cylinder roller 30 made of porous stone, Carborundum or other hard porous material for the purpose hereinafter to be described. Cylinder roller 30 is spaced forwardly of drum 20, but is in constant engagement with roller 26. Roller 30 has no gear connections and it rotates when wetting roller 26 drives it by frictional contact.

Secured to the side wall 14 is a hub 27 which supports a rotatable stub shaft 33 on which is fixedly secured a gear 29 which meshes with gear 22. An operating handle 31 is secured to stub shaft 33 to manually rotate same. Rotation of the stub shaft 33 will rotate gear 29 to drive gear 22 thereby rotating the drum 20 with shaft 18.

Positioned forwardly of shaft 28 but on the same horizontal plane is shaft 32 which carries a sponge rubber cylinder roller 34 made of neoprene in constant engagement with roller 30. The shaft 32 is journalled in hook shaped members 1 which are formed on the walls 2 which in turn are secured in trough 36. A metal spring 4 retains the ends of shaft 32 in the end 1 of end walls 2. Spring 4 is secured to end walls 2.

A trough 36 for containing alcohol is secured to the side plates 12 and 14 and the lower part of roller 34 (Fig. 7) rotates just above said trough so as not to touch the alcohol or fluid in the trough. The circumference of roller 34 is one half that of roller 30. A wick member generally indicated as 38 is supported in said trough to impart the alcohol to the roller 34. The wick member as will be explained may be controlled to be either in constant engagement with roller 34 or in intermittent engagement therewith, as will be subsequently described. A small container not shown is positioned over trough 36 for supplying alcohol by gravity feed to trough 36.

The wick member includes a rod 39 rockably mounted in the walls 2 of the trough 36 and said rod supports a metal plate 40 to which is suitably secured a pad 42 formed of felt material covered by a silk covering. The upper portion of the plate 40 is hooked as at 43 to support a rod 44 the opposite ends of which extend through arcuate shaped slots 46 in the side members 12 and 14. Coil springs 48 have one end secured to the rod 44 and the opposite end to a bracket 50 on the side members 12 and 14 to urge the wick member 38 into engagement with roller 34 as best shown in Fig. 7.

The means for operating the wick member 38 for selective engagement with the roller 34 will be subsequently described.

Figure 10:
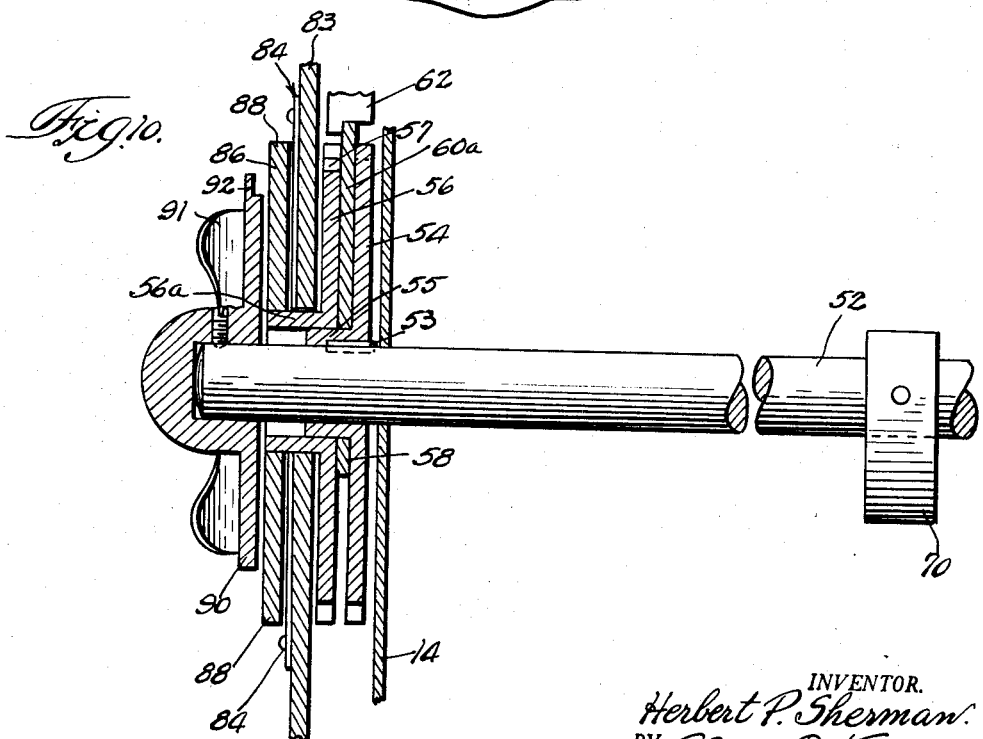
Fig. 10 is a cross sectional view taken on line 10—10 of Fig. 9.

A shaft 52 is journalled in the side members 12 and 14 and has splined thereto as at 53 exteriorly of side member 14 a ratchet 54 which rotates with shaft 52 (Fig. 10). The ratchet 54 has a hub 55 on which is rotatably mounted a ratchet 56 having 50 teeth and a recess indicated by the numeral 57. The ratchet 56 has a hub 56a.

The shaft 52 supports a fork member generally indicated at 60 which is fulcrumed on said shaft. The fork member 60 has a stem portion 60a which is positioned between ratchets 54 and 56 which ratchets are of the same diameter and is fulcrumed on hub 55 and shaft 52. The fork member supports a stepped pawl 62 whose spring loading urges the long part of the step 62a in engagement with ratchet 56. The side member 14 of the frame supports a secondary pawl 64 which is spring loaded and prevents counter rotation of ratchets 54 and 56.

The fork member 60 has a pair of spaced upwardly extending tines 60b which are in engagement with an eccentric 68 (Fig. 1) fixedly mounted on shaft 18 on which the drum 20 is mounted. The eccentric 68 is mounted on the shaft 18 exteriorly of side member 14 and adjacent gear 22. Thus with each complete revolution of the drum 20 and shaft 18 the eccentric 68 will rock the fork member 60 backward and forward and as the fork member moves forward or to the right as shown in Fig. 1 the pawl 62 will rotate the ratchet 56 one tooth. Shaft 52 has fixedly secured thereto an eccentric or cam 70 for the purpose to be hereinafter described.

When the ratchet 56 has been rotated so that the step 62a of pawl 62 reaches the slot or recess 57 of the ratchet 56 it drops into said recess, thus causing the short portion of the stepped pawl to engage the ratchet 54 to rotate ratchet 54 one tooth. Since the ratchet 54 is splined to shaft 52 it will correspondingly rotate shaft 52. Thus we see that with every complete revolution of ratchet 56, the ratchet 54 will rotate one tooth to rotate shaft 52 and eccentric 70 equivalent to the movement of one tooth and since every revolution of the drum 20 moves the ratchet 56 one tooth every 50 revolutions of drum 20 will rotate shaft 52 equivalent to one tooth of the ratchet 54.

Supported in the side members 12 and 14 of the frame is a rod 72 which supports a pair of spaced arms or links 74 (Figs. 4 and 7) which in turn support a shaft 76 which carries a roller 78 in engagement with cam 70 on shaft 52. The upper ends of the arms 74 support a shaft 80 which carries a rubber cylinder pressure roller 82 in engagement with the drum 20.

Rotation of the shaft 52 (equivalent to one tooth of the ratchet 54 at a time) will rotate the eccentric 70 thereon and through its engagement with roller 78 pivot the arms 74 about rod 72 as a fulcrum and move the pressure cylinder roller 82 closer to the drum 20. With the position of the eccentric 70 shown in the position of Fig. 7 the pressure of pressure roller 82 against the drum 20 is reduced, however, as the eccentric 70 is rotated clockwise it elevates the arms 74 and the pressure of pressure roller 82 is increased against the drum 20. The purpose of this is to increase the pressure of the paper sheets S against the drum 20 as each successive 50 sheets are run through the machine. Thus as the impressions or reproductions from the master copy on drum 20 on the paper becomes lighter, the pressure roller 82 increases its pressure so that as sheets of paper are passed between the drum 20 and pressure roller 82 the pressure is increased to maintain the desired reproduction on the sheets.

Secured to the side wall 14 to enclose the operating parts is a side cover member designated at 83 and shown in section in Fig. 10. Said cover has an opening to accommodate the shaft 52 as well as an opening to accommodate stub shaft 33. Secured to the cover member is a circular, stationary, indicating plate 84 having an enlarged central opening 85 which surrounds the hub 56a of the ratchet 56. The stationary indicating plate 84 is marked with a "start" designation and with spaced numerical indications 50 to 500, every 50 numbers apart. A rotatable circular indicating plate 86 is fixedly mounted on the hub 56a of the ratchet 56 to rotate therewith and to rotate with respect to the stationary plate 84. Rotatable indicating plate 86 has a serrated peripheral surface 88 and is marked off with the numerals 1 to 50 inclusive. A disc 90 having a hand knob 91 is fixedly secured to shaft 52 to rotate therewith and said disc has a pointer 92. In starting the hand knob 91 is turned so that the pointer 92 is pointing to the "start" designation on stationary indicating plate 84. As ratchet 56 is advanced one tooth at a time by pawl 62 it rotates with it the rotatable indicating plate 86 which carries the numerals 1 to 50 and said plate rotates with respect to pointer 92, thus indicating up to 50 the number of sheets passed through the machine. When the ratchet 56 has made a complete revolution (50 sheets have passed through the machine) the pawl 62 will drop in the slot 57 of the ratchet 56 to engage ratchet 54 to move it one tooth which thereby correspondingly rotates shaft 52 and disc 90 and pointer 92 one notch to the numeral 50 on stationary indicating plate 84. The pointer 92 points to the numerals on stationary indicating plate 84 and the numeral on rotatable indicating plate 86 to indicate at all times the number of sheets passed through, for example if the pointer 92 points at the number 50 on stationary plate 84 and the number 7 on rotatable plate 86 it would indicate that 57 sheets have passed through the machine. After the ratchet 56 has made another complete revolution and moved with it plate 86 one complete revolution, the ratchet 54 will be moved one tooth to correspondingly rotate shaft 52 and pointer 92 on disc 90 one space from 50 to 100 indicating that 100 sheets have passed through. Thus every 50 advances or one complete revolution of the ratchet 56, ratchet 54 is advanced one tooth, rotating shaft 52 and eccentric 70 to bear against roller 78 and increase the pressure between impression roller 82 and the drum 20. The knob 91 is used to manually reset the plate 90, shaft 52 and ratchet 54 to starting position.

Journalled in the side frames 12 and 14 is a shaft 94 which supports a worm shaped cylindrical roller 96 in contact with wetting roller 26. The sheet of paper before contact with the drum 20 passes between wetting roller 26 and roller 96. Shaft 94 of worm roller 96 is supported in bearing members 94a which slide in slots in the side frames 12 and 14 and which bearing members are urged upwardly by springs 94b (Fig. 1) so that worm roller 94 is in pressure engagement with wetting roller 24.

As previously pointed out the wick member 38 is urged in engagement with the sponge cylindrical roller 34 which sponge roller extracts the alcohol or fluid from the wick. When it is in constant engagement therewith the maximum amount of alcohol will be extracted. Means are therefore provided for selective engagement of the wick member 38 with roller 34 for varying the amount of alcohol transmitted to the roller 34 and said means will now be described.

As best shown in Fig. 1 the fork member 60 has pivotally secured to it as at 93 an arm 99 which has a stepped edge 95 at the opposite end thereof. The arm 99 has a slot 101 which is in sliding engagement with a pin 98 secured to a lever 100. The lever 100 is pivotally secured as at 102 to the wall 14 and said lever has a rearward offset extension 103 which carries the pin 98. By moving the lever 100 the arm 94 is positioned relative to the rod 44 which is connected to the wick member 38. A washer and cotter pin are secured to the pin 98 to retain the arm 99 thereon.

The wall 14 is provided with 3 spaced indentations 104, 105 and 106, which are adapted to be engaged by a boss 108 on the extension 109 of arm 99. When the lever 100 is in the position shown in Fig. 1 with the boss 108 in engagement with the indentation 104, the arm 94 will be clear of the rod 44 thus the wick member 38 will be in constant engagement with roller 34 to continuously supply alcohol to said roller from the trough. This is considered the "high" position for heavy wetting of the paper.

As the drum shaft 18 is rotating it rotates the eccentric 68 thereon, which moves between the tines 60b and rocks the fork member 60 on the shaft 52. As the fork member 60 moves it moves the arm 94 pivotally secured thereto. By maintaining the lever 100 in the elevated position shown in Fig. 1 the arm 99 will not engage the rod 44 as previously described, thus the wick 38 will be in constant engagement with roller 34 and will constantly supply alcohol thereto. By moving the lever to the right as shown in Fig. 8 so that the boss 108 engages the indentation 105, which is the "medium" position, the arm 94 is lowered so that as the arm moves to the left the edge 95a of the stepped end will engage the rod 44. The engagement of edge 95a of the arm 99 with rod 44 continues as the arm 99 is moving forwardly (to the left) and rearwardly (to the right) which is for one-half revolution of the drum shaft 18, therefore the wick member 38 engages the roller 34 to supply alcohol thereto for one half of the rotation of drum 20.

When the lever 100 is moved farther to the right as shown in Fig. 8a so that the boss 108 engages the indentation 106 which is the "low" position of the lever, the arm 99 is lowered so that the edge 95b of the arm 99 will engage the rod 44 to urge the wick member away from the sponge roller 34. The edge 95b engages the rod 44 both on the forward and rearward stroke of the arm and continues this engagement so that for ¼ rotation of the drum 20 the wick member 38 will engage the roller 34 or conversely the edge 95b of the arm 94 engages the rod 44 for three fourths of the rotation of the drum 20.

In first starting the machine, the lever 100 is positioned in "high" position so that sufficient alcohol is transferred from the wick 38 to roller 34. The lever 100 is then positioned in "medium" position and when the paper is passed through the machine the lever is positioned in "low" position so that a very thin layer of alcohol is placed on the sheet.

Fixed to rotate with the drum shaft 18 (Fig. 6) exteriorly of side wall 12 is a circular plate 110 which has an inner eccentric trackway 112. Pivotally mounted on the side wall 12 as at 114 is an arm 116 which carries a segment gear 118 at the end thereof. The arm 114 supports a rotatable roller 120 which rides in the trackway 112. Segment gear 118 meshes with gear 122 which is supported in free wheeling engagement with shaft 24 which supports the wetting roller 26. Gear 122 will rotate shaft 24 when segment gear 118 is moving on the upstroke, but said gear will be free wheeling on the shaft when segment gear is moving on the downstroke.

Supported on side wall 12 is a stub shaft 124 on which is freely rotatably mounted a gear 126 in mesh with gear 122. Stub shaft 124 supports a pair of spaced arms 128, one on each side of gear 126, which arms support a gear 130, and a shaft 132 on which is fixedly mounted gear 134 in mesh with gear 130. Shaft 132 supports a pair of spaced rubber friction rollers 136. The spaced arms 128 also extend upwardly as at 128a (Fig. 3) to support a rod 138 positioned above the friction rollers 136. The opposite ends of shaft 132 and rod 138 are supported on an arm 140 pivoted as at 141 on side frame 14. The side frames 12 and 14 have aligned arcuate shaped slots 142 in which the shaft 132 and rod 138 move as a unit.

A manually operated lever 146 is pivotally secured as at 148 to side wall 12 and said lever is spring biased as at 148. The lever 146 has a hooked end 149 which engages the rod 138. The lever 146 as shown in Fig. 1 retains the friction wheels 136 in their up position out of engagement with the sheet of paper to be printed which are stacked on a suitable tray, not shown, positioned forwardly of the machine or to the left of Fig. 1 as is well known in the art. By pivoting the lever 146 downwardly to the left in Fig. 1, the hooked end 149 disengages the rod 138 to permit the friction rollers 136 to drop by gravity on the sheets of paper.

As the drum shaft 18 is rotated as previously explained, the segment gear 118 will through the roller 120 and trackway 112 be moved to first move up and then down in constant engagement with gear 24 which is supported in free wheeling position on shaft 24 which supports the wetting roller 26. With each complete revolution of the drum 20 and shaft 18 the gear segment 118 will make an upward and downward stroke.

When segment gear 118 is moving on the upstroke it rotates gear 122 clockwise as viewed in Fig. 6, to correspondingly rotate shaft 24 and wetting roller 26. When gear 122 is rotating in the opposite direction on the downstroke of segment gear 118 no rotation is imparted to shaft 24 and wetting roller 26.

Rotation of gear 122 clockwise on the upstroke of segment gear 118 will through gears 126 and 130 impart a counterclockwise rotation to gear 134 to correspondingly rotate shaft 132 and friction rollers 136 in the same counterclockwise direction. When the gear 122 is free wheeling and rotating counterclockwise, a clockwise rotation will be imparted to shaft 132 and friction rollers 136. Thus for every revolution of the drum 20 the segment gear 118 completes a down stroke and an up stroke. On the down stroke of segment gear 118 the wetting roller 26 remains stationary, on the upstroke it is rotated. On the downstroke of the segment gear 118 the friction rollers 136 rotate clockwise to engage the sheet of paper to advance it into the machine. On the upstroke of the segment gear the friction rollers rotate counterclockwise so as not to feed the next sheet into the machine, and not until the next rotation will the next paper sheet be fed.

The front of the machine is provided with the usual apron 150 and top 152 provided with an opening 154 therebetween which is positioned just forwardly of the worm cylinder roller 94. The paper sheet from the tray not shown, is moved by the friction rollers 136 to pass through the opening 154 between the wetting roller 26 and worm roller 96 then rearward between the drum 20 and impression roller 82 and deposited on a tray not shown on the rear of the machine. A master sheet as is well understood in the art is suitably secured around the drum 20. As the paper sheet passes between the wetting roller 26 and worm roller 96 the top of the sheet is covered with a thin layer of alcohol before it engages the master sheet on the drum. The amount of alcohol imparted to the sheet can be controlled by the manipulation of lever 100. For a heavier coating of alcohol, lever 100 is positioned in "high" position so that the wick member 38 is in constant engagement with roller 34 with alcohol. In "medium" position of lever 100 less alcohol is applied to roller 34 for it engages the wick member 38 for a lesser period and in "low" position of lever 100 the wick member engages the roller 34 for an even lesser period.

The alcohol on roller 34 is transferred to stone roller 30 then to wetting roller 26 then to the paper as previously described.

The counting mechanism will count the sheets passing through the machine and with each 50 sheets the impression roller 82 will be advanced closer to the drum 20 due to step by step rotation of eccentric 70 on shaft 52, thus as sheets pass through the machine and the reproductions would normally become lighter or fainter on the sheets, however with this invention this is eliminated as the impression roller 82 exerts a greater pressure on the sheet against the drum and compensates for same and thereby produces a reproduction which is as good on the last sheet as the beginning sheets.

The sponge rubber roller 34 in contact with the wick member, is made of synthetic rubber or neoprene which is uneffected by alcohol acids or oils, but is highly spongy and very absorbent. It absorbs the alcohol or fluid from the wick.

The sponge roller 34 extracts or takes a specific amount of alcohol from the wick. The porous stone roller 30 due to its porosity extracts by absorption a portion of the alcohol or fluid from the sponge roller 34 with which it is in constant engagement. The Carborundum or stone roller 30 is highly porous and possesses a capillary action and will absorb only a maximum amount of alcohol or fluid, thus is controlled the amount of alcohol or fluid which stone roller 30 can absorb. The neoprene or synthetic rubber wetting roller 26 is a solid type of roller but is very soft and resilient and is constantly pressing against stone roller 30 by spring pressure. Wetting roller 26 will draw out the alcohol or fluid from stone roller 30 by the pumping action of the soft resilient wetting roller against the stone roller 30 and will transfer the alcohol or liquid to the paper sheet in a uniform layer or coating.

While this machine is shown for particular use in spirit duplicating it has other uses, for example, it may be used for the purpose of coating paper without printing on same and this may be accomplished by feeding a liquid coating material to the trough 36 which applies it to the sheet as was explained with alcohol and not applying a master sheet to the drum 20.

The advantages inherent in the machine are set forth in the objects and specification. It will be understood that various changes and modifications may be made without departing from the spirit and scope of the appended claims.

I claim:

1. In a spirit duplicating machine of the character described comprising a shaft, a drum supported on said shaft and rotatable therewith, a second shaft secured below said first mentioned shaft, a fork member fulcrumed on said second shaft and operated by an eccentric mounted on said first mentioned shaft, an arm secured to said fork, a pivotally mounted wick member positioned forwardly of said arm, a trough for containing a spirit liquid which is absorbed by said wick member, a cylindrical roller adjacent said wick member, a manually operated lever in engagement with said arm for selectively positioning said arm with respect to said wick member in any of a plurality of positions whereby said wick member may be positioned to remain in constant engagement with said roller or in intermittent engagement with said roller to control the amount of spirit liquid imparted from said wick member to said roller.

2. In a spirit duplicating machine of the character described including a cylindrical drum, an impression roller positioned adjacent thereto to permit the passage of a sheet between said drum and said impression roller, a wetting cylinder positioned forwardly of said drum for imparting a coating of spirit liquid to the sheet prior to its passage between said drum and said impression roller, counting means for counting the number of sheets passed through said machine, and means controlled by said counting means and intermittently operated after the passage of a plurality of sheets for progressively increasing the pressure of said impression roller against said drum, said last mentioned means being operative recurrently once during the passage of each plurality of sheets.

3. In a spirit duplicating machine of the character described comprising a cylindrical drum, a wetting roller positioned forwardly of said drum and adapted to apply a coating of liquid material to a sheet prior to its engagement with said cylindrical member, counting means operated by the rotation of said drum for counting the sheets passed through said machine, an impression roller positioned adjacent said cylindrical drum and means controlled by said counting means and operative recurrently only after the passage of a plurality of sheets for intermittently and progressively increasing the pressure of said impression roller against said drum.

4. In a spirit duplicating machine of the character described comprising a cylindrical drum, an impression roller positioned adjacent thereto for passage of a sheet between said drum and said impression roller, a wetting roller for imparting a thin layer of spirit liquid to said sheet prior to its passage between said drum and said impression roller, means controlled by the rotation of said drum for counting the number of sheets passed through said machine, said counting means including a shaft having a first and second ratchet with said first ratchet fixedly secured to said shaft to rotate therewith and the second ratchet adapted to rotate relative to the first ratchet, means for rotating said second mentioned ratchet with the passage of each sheet to operate the counting means to indicate the passage of each sheet, means operated when said first ratchet has rotated a complete revolution to rotate said second ratchet and operate the counting means to indicate the passage of a plurality of sheets, the movement of said first ratchet adapted to rotate said shaft and means on said shaft adapted to move said impression roller to progressively increase the pressure of said impression roller relative to said cylindrical drum.

5. In a duplicating machine of the character described including a cylindrical drum, an impression roller mounted adjacent thereto, a wetting roller positioned forwardly of said cylindrical drum and adapted to apply a liquid coating to a sheet prior to its passage between said cylindrical drum and said impression roller, means for counting the sheets passed through said machine, said means including a shaft, a plurality of ratchet members mounted on said shaft with one of said ratchets fixedly secured to said shaft to rotate therewith to actuate the counting means to count the passage of a plurality of sheets and the other of said ratchet members adapted to rotate relative to said shaft to actuate the counting means to count the passage of individual sheets, means for first rotating said second mentioned ratchet and then for rotating said first mentioned ratchet as said sheets pass through said machine, the rotation of said first mentioned ratchet adapted to increase the pressure between said impression roller and said drum.

6. In a spirit duplicating machine of the character described including a shaft, a cylindrical drum mounted on said shaft to be rotated thereby, an impression roller mounted adjacent said drum, means for counting the sheets passed through said machine, said means including an eccentric fixedly mounted on said shaft to rotate therewith, a second shaft, a fork member fulcrumed on said second shaft and in engagement with said eccentric to be operated thereby, a pair of ratchet wheels mounted on said second shaft with one of said ratchet wheels fixed to rotate with said shaft and the other of said ratchet wheels adapted to be rotated relative to said first mentioned ratchet wheel, counting means controlled by the rotation of said ratchet wheels to count the rotation of said cylindrical drum, means on said fork member adapted to first rotate said second mentioned ratchet wheel to actuate said counting means to count individual sheets and then said first mentioned ratchet wheel to actuate said counting means to count the passage of a plurality of sheets, the rotation of said first mentioned ratchet wheel adapted to increase the pressure between said impression roller and said drum.

7. In a spirit duplicating machine of the character described including a shaft, a cylindrical drum mounted on said shaft to be rotated thereby, an eccentric fixedly mounted on said shaft to rotate therewith, a second shaft, a fork member fulcrumed on said second shaft, a pair of ratchet wheels mounted on said second shaft with one of said ratchet wheels fixed to rotate with said shaft and the other of said ratchet wheels adapted to be rotated relative to said first mentioned ratchet wheel, means on said fork member adapted to first rotate said second mentioned ratchet wheel and then said first mentioned ratchet wheel, counting means controlled by the rotation of said ratchet wheels to count the rotation of said cylindrical drum, said counting means including a pair of counting members each controlled by one of said ratchet wheels for separately counting the individual rotations and the plurality of rotations of said drum, and an impression roller controlled by said second mentioned shaft to intermittently increase the pressure of said impression roller against said cylindrical drum.

8. In a spirit duplicating machine of the character described comprising a cylindrical drum, an impression roller positioned adjacent said drum, means for intermittently and successively increasing the pressure of said impression roller against said drum once during each plurality of rotations of said drum, a wetting roller positioned forwardly of said drum to apply the liquid to the sheet, a trough for containing a spirit liquid, a wick member adapted to absorb said spirit liquid, a plurality of cylindrical rollers between said wick member and said wetting cylinder with one of said rollers being formed of stone or the like to transfer the spirit liquid from said wick to said wetting roller, means for controlling the engagement of said wick member with one of said rollers to selectively control the amount of spirit liquid transferred from said wick to said wetting roller, counting means controlled by the rotation of said drum for counting the rotation of said drum, said counting means including separate counting members, one of said counting members adapted to count the passage of each sheet and the other of said counting members adapted to count the passage of a plurality of sheets, said counting means when actuated adapted to increase the pressure between the impression roller and said drum.

9. In a spirit duplicating machine of the character described comprising a shaft, a drum supported on said shaft and rotatable therewith, a second shaft, a member fulcrumed on said second shaft and operated by an eccentric mounted on said first mentioned shaft, an arm secured to said fulcruming member, a pivotally mounted wick member, means for supplying a spirit liquid to said wick member, a cylindrical roller adjacent said wick member, an impression roller positioned adjacent said drum, means for progressively increasing the pressure of said impression roller against said drum with the recurrent passage of each plurality of sheets, a wetting roller positioned forwardly of said drum, a cylindrical roller formed of stone or the like positioned between said first mentioned roller and said wetting roller to transfer the spirit liquid from said wick member to said wetting roller, manually operated means in engagement with said arm for selectively positioning said arm with respect to said wick member in any of a plurality of positions whereby said wick member may be positioned to remain in constant engagement with said first mentioned roller or in intermittent engagement therewith to control the amount of spirit liquid imparted from said wick member to said first mentioned roller.

10. In a spirit duplicating machine of the character described including a cylindrical drum, an impression roller positioned adjacent thereto to permit the passage of a sheet between said drum and said impression roller, a wick member, means for supplying a fluid to said wick member, a cylindrical sponge roller positioned adjacent said wick member which extracts said fluid from said wick member, a cylindrical hard porous roller adjacent said sponge roller which extracts said fluid from said sponge roller and retains said fluid, a soft resilient cylindrical wetting roller adjacent said hard porous roller for pumping said fluid from said hard porous roller to said wetting roller, said wetting roller adapted to apply a uniform coating of said fluid to the sheet prior to passage between said drum and impression roller, counting means for counting the number of sheets passed through said machine, and means controlled by said counting means and intermittently operated after the passage of a plurality of sheets for progressively increasing the pressure of said impression roller against said drum, said last mentioned means being operative recurrently once during the passage of each plurality of sheets.

11. In a structure defined in claim 10 in which the cylindrical hard porous roller is formed of porous stone or the like.

References Cited in the file of this patent

UNITED STATES PATENTS

| | | |
|---|---|---|
| 2,036,972 | Storck | Apr. 7, 1936 |
| 2,262,511 | Morrison | Nov. 11, 1941 |
| 2,534,765 | Genz | Dec. 19, 1950 |
| 2,586,461 | Ford et al. | Feb. 19, 1952 |
| 2,666,412 | Ford | Jan. 19, 1954 |
| 2,745,340 | Ritzerfeld | May 15, 1956 |